United States Patent [19]

Yamanashi et al.

[11] Patent Number: 4,557,711

[45] Date of Patent: Dec. 10, 1985

[54] PHASE CONTROL DEVICE

[75] Inventors: Yoshihiro Yamanashi; Minoru Okuma; Masahito Hata; Toshio Nishihara, all of Kanagawa, Japan

[73] Assignee: Toyo Shokuhin Kikai Kabushiki Kaisha, Yakohama, Japan

[21] Appl. No.: 529,941

[22] Filed: Sep. 7, 1983

[30] Foreign Application Priority Data

Sep. 30, 1982 [JP] Japan .................................. 57-172869

[51] Int. Cl.$^4$ .............................................. B62D 1/00
[52] U.S. Cl. ....................................... 474/900; 74/393
[58] Field of Search .................. 474/900, 103; 74/393, 74/394; 198/575

[56] References Cited

U.S. PATENT DOCUMENTS 3,049,276  8/1962  Wilkins ............................ 474/900 X
3,496,918  2/1970  Finlay ............................. 474/900 X
3,888,217  6/1975  Hisserich ........................ 474/900 X Primary Examiner—James A. Leppink
Assistant Examiner—Frank H. McKenzie, Jr.
Attorney, Agent, or Firm—Donald D. Mon; David O'Reilly

[57] ABSTRACT

Phase control device comprising a driven wheel and a driving wheel. The driven wheel engages an endless loop, whose going part toward the driving wheel and returning part from the driving wheel engage a pair of idling wheels and one or plural pairs of movable wheels. The movable wheels are finely adjusted toward a cross direction to the endless loop so that either the going part and the returning part is pulled, while the other is slackened. As a result, the phase of the driven wheel is changed so that timing of the driven wheel against the driving wheel can be regulated. The phase control device provides timing of the operation of a pair of machines such as coveyors which link mutually.

3 Claims, 9 Drawing Figures

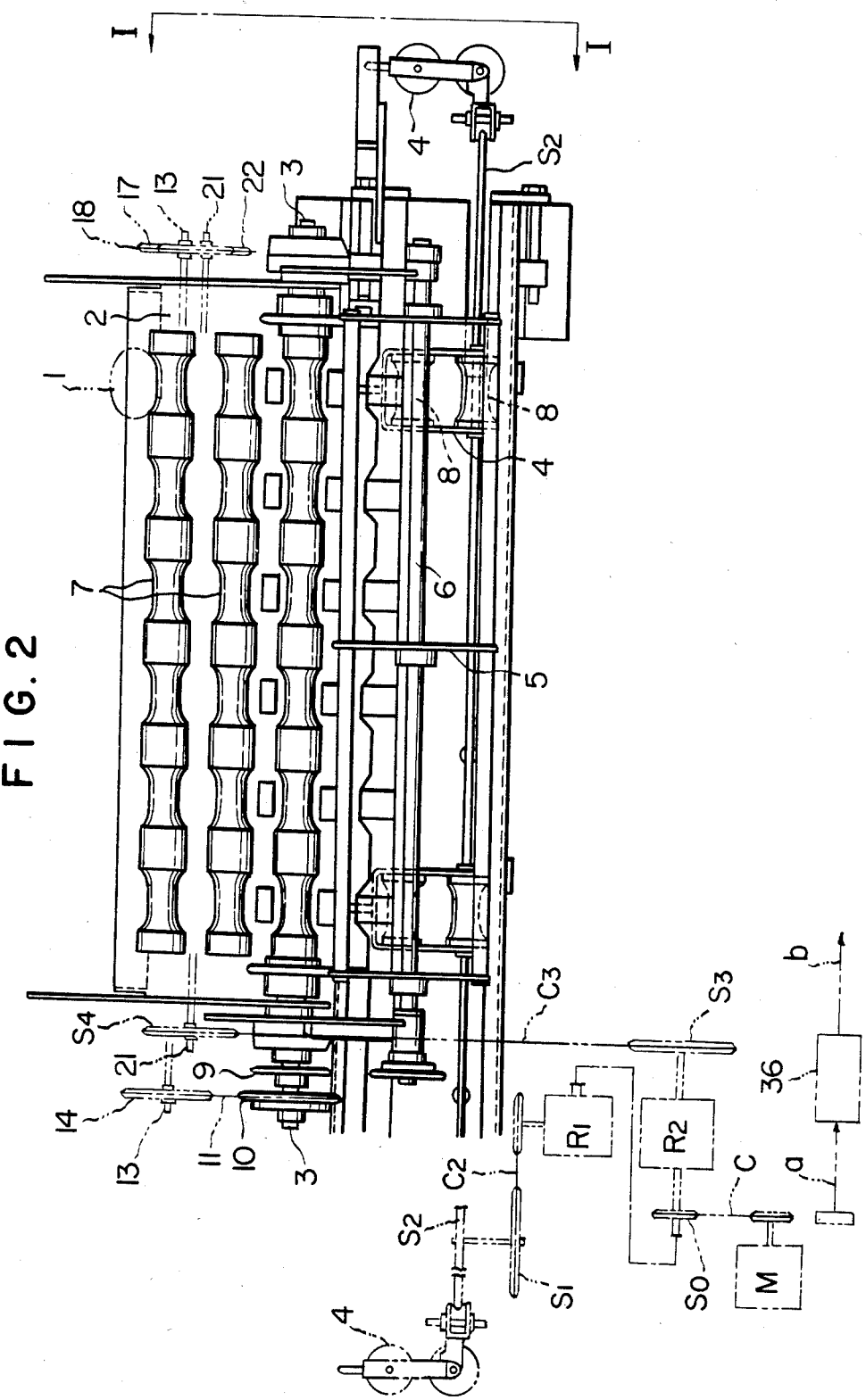

PHASE CONTROL DEVICE

FIELD OF THE INVENTION

This invention relates to a phase control device which provides timing of the operation of a pair of machines such as conveyors which link mutually, for example, a phase control device for controlling phase of the first conveyor to phase of second conveyor according to carrying speed of articles, in which articles travel from the first conveyor to the second conveyor by natural drop.

BACKGROUND OF THE INVENTION

As the above-mentioned phase control device, various deivces such as devices with differential gear machanism are already known. However, conventional phase control devices which have many precise parts, are high in cost and have defect that maintainance is difficult, and is of poor lasting quality against water. Furthermore its installation on a machine is difficult.

BRIEF DESCRIPTION OF THE INVENTION

Accordingly, it is an object of the present invention to provide phase control device which has simple construction and lasting quality against water, and whose installation to machine is easy.

BRIEF DESCRIPTION OF THE DRAWING

In the drawing,

FIG. 2 is a partial plan view of the example.

DETAILED DESCRIPTION OF THE INVENTION

Figure 1A:
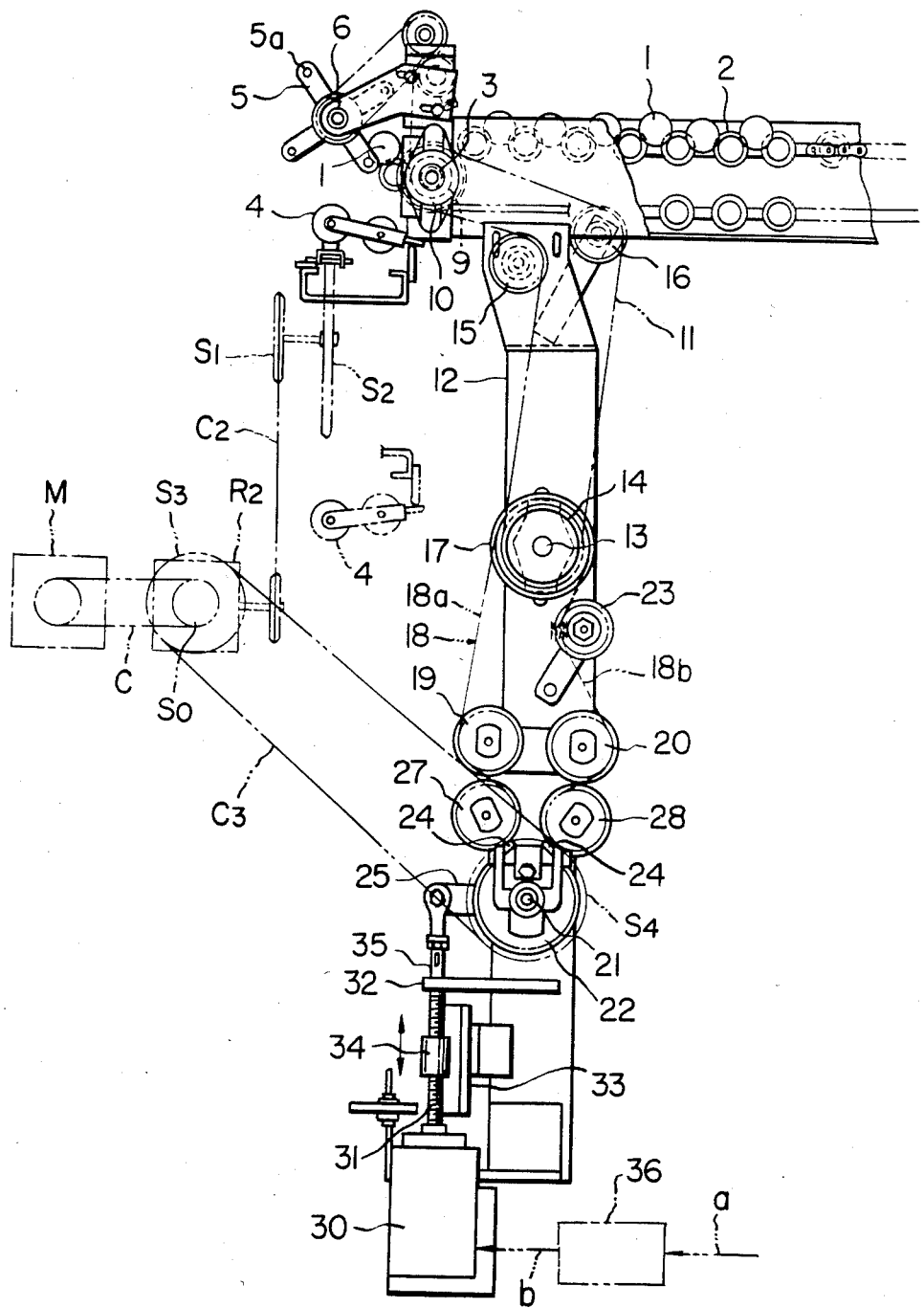
FIG. 1(a) is a side view of an example of a phase control device of this invention in which the phase control device is applied to a conveying apparatus of an egg-breaking machine, taken as indicated by the line I-I on FIG. 2.

Referring now to FIGS. 1(a) to 1(c) and 2, a conveying apparatus having the phase control device of this invention has the first conveyor 2 and the second conveyor 4. The first conveyor 2 conveys plural articles such as eggs 1 in a row or plural rows. In front of and below a supporting shaft 3 which supports the forward end of the first conveyor 2, the second conveyor 4 is arranged. The second conveyor 4 conveys the articles 1 dropped from the forward end of the first conveyor 2 in the lateral direction to the first conveyor 2. In front of and above the supporting shaft 3, guide wheels 5 with four supporting bars 5a are arranged, which can be rotated on a shaft 6. In the drawing, numeral 7 designates a concave part of the first conveyor 2 for receiving the article 1, and numeral 8 designates a concave part of the second conveyor 4 for receiving the article 1.

Figure 1B:
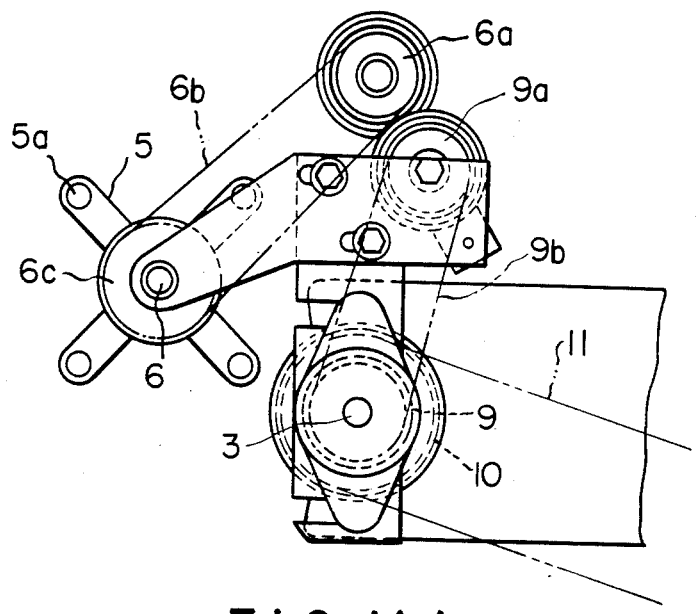
FIG. 1(b) is a side view, on an enlarged scale, of a drive of guide wheels of the example shown in FIG. 1(a).
Figure 1C:
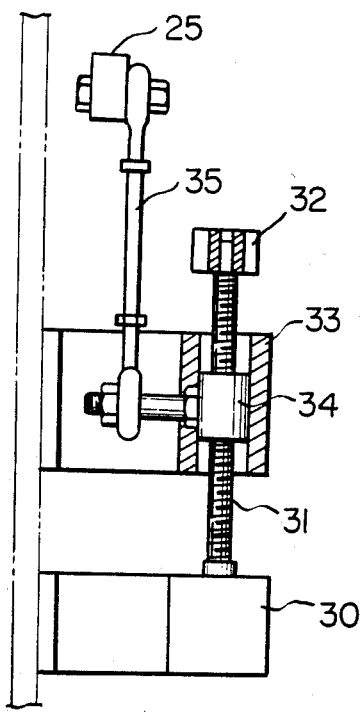
FIG. 1(c) is a side view partly in section, on an enlarged scale, of a fine adjustment of the example shown in FIG. 1(a).

As shown in FIGS. 1(b) and 2, a sprocket wheel 9 is attached on the supporting shaft 3. The sprocket wheel 9 is linked up with a sprocket wheel 6c attached to a shaft 6 through two chains 9b and 6b and a gear 9a, and a gear 6a. As shown in FIG. 1(a), a sprocket wheel 10 is linked up with a sprocket wheel 14 through the first chain 11. The sprocket wheel 14 is mounted rotatably to a side of a frame 12 with a supporting shaft 13.

In the drawing, numeral 15 designates a guide sprocket wheel, and numeral 16 designates a tension sprocket wheel.

A driven sprocket wheel 17 is attached to the supporting shaft 13 of the sprocket wheel 14, and the driven sprocket wheel 17 is engaged with the second chain 18. Opposite sides of the second chain 18 reach at a driving sprocket wheel 22 which is mounted rotatably to the lower part of the frame 12 with a shaft 21 through outer sides of a pair of idling sprocket wheels 19 and 20 which are mounted rotatably to the frame 12 with shafts of idling sprocket wheels, by which the driven sprocket wheel 17 is to the driving sprocket wheel 22. The shaft 21 is connected to the same power source as a power source which drives the second conveyor 4. In the drawing, numeral 23 designates an idling sprocket wheel for applying tension to the second chain 18.

Figure 3:
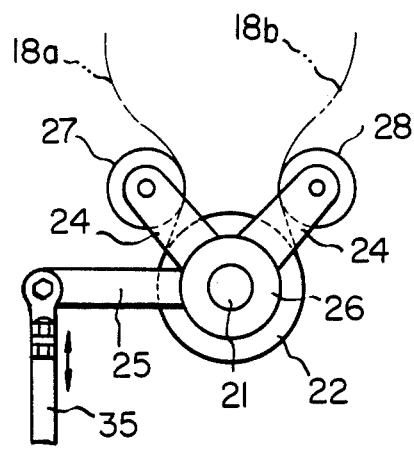
FIG. 3 is a side view of a turning part.

As shown in FIG. 3, a turning part 26 having three arms 24 and 25 is attached to the shaft 21. Movable sprocket wheels 27 and 28 which engage with outer sides of a going part (i.e., advancing portion) 18a and a returning part (i.e., return position) 18b of the second chain 18 respectively below the idling sprocket wheels 19 and 20 are mounted rotatably to the arms 24 respectively.

A lead screw 31 is held vertically at the lower part of the frame 12. The lead screw is driven by a pulse motor 30. The pulse motor 30 is directed by command signal b which is sent from a control device 36. A nut 34 which is held by a guide 33 so as not to turn is engaged with the lead screw 31, and the nut 34 is connected to the arm of the turning part 26 through a link 35.

As shown FIGS. 1(a) and 2, a motor M drives the shaft 21 through a chain c, sprocket wheel S0, a reducer R2, a sprocket wheel S3, a chain C3, and a sprocket wheel S4, while the motor M drives the second conveyor 4 through the chain C, a sprocket wheel S0, a reducer R1, a chain C2, a sprocket wheel S1 and a sprocket wheel S2.

How the above-mentioned device works is explained as follows.

The shaft 21 is rotated by the above-mentioned driving mechanism and the power is transmitted to the supporting shaft 3 through the driving sprocket wheel 22, the second chain 18, the driven sprocket wheel 17, the sprocket wheel 14, the first chain 11, and the sprocket wheel 10, so that the first conveyor 2 is driven forward, while as shown in FIG. 1(b) the guide wheel 5 is driven by the sprocket wheel 9 attached to the supporting shaft 3 through gear 9a and gear 6b in opposite direction to the direction of rotation of the supporting shaft 3, cooperating with the first conveyor 2 so that the articles 1 are fed to the second conveyor 4.

The second conveyor 4 is driven directly by the driving mechanism, synchronizing with the first conveyor 2, at the speed which is higher than that of the first conveyor 2. Accordingly, the articles 1 conveyed in a row or plural rows by the first conveyor 2 fall one by one every row from the forward end of the first conveyor 2 on the second conveyor 4, and then the articles standing in a row are conveyed in the lateral direction to the first conveyor 2 at high speed by the second conveyor 4.

For regulating the synchronous relation between the first conveyor 2 and the second conveyor 4, the stepping motor 30 shown in FIG. 1. The stepping motor 30 turns the lead screw 31 so that the nut 34 is moved finely up or down in a vertical line. The motion of the nut 34 is transmitted to the turning part 26 through the link 35 and the arm 25 so that the turning part 26 is turned clockwise or counterclockwise, and the movable sprocket wheels 27 and 28 are moved finely toward the right or left from the second chain 18. Accordingly, when the movable sprocket wheels 27 and 28 are moved toward the right in FIG. 1, the returning part 18b of the second chain 18 will be slackened while the going part 18a of the second chain 18 will be pulled, so that the driven sprocket wheel 17 will be turned counterclockwise by the extra turning force which is applied to the driven sprocket wheel 17. When the movable sprocket wheels 27 and 28 are moved toward the left, the driven sprocket wheel 17 will be turned clockwise by the turning force which is applied to the driven sprocket wheel 17. Accordingly, the phase of the first conveyor 2 against the phase of the second conveyor 4 can be changed so that timing of the two can be regulated.

When the running speed of machine is changed speed signal a is received by control device 36. Control device 36 detects the change amount of speed and gives the command signal b of the rotation at the previously set optimum amount to the stepping motor 30. The command signal commands the stepping motor to turn the lead screw 31. With turn of the lead screw 31, the movable sprocket wheels 27 and 28 are moved, by which timing of the driven sprocket wheel 17 against the driving sprocket wheel 22 can be changed, so that the articles 1 can be carried safely. Therefore, the operation speed can be set without restraint. As articles such as eggs have different sizes, the condition of conveying operation can be maintained. However, according to this invention, articles can be carried in safe no matter what the size of article is.

Figure 4:
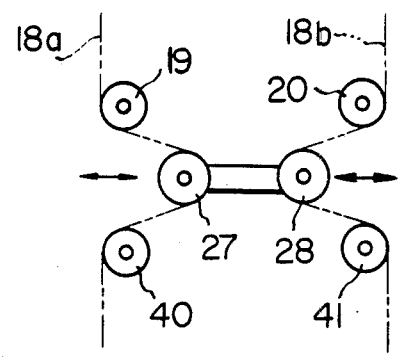
FIGS. 4 to 7 are a side view of other instances of a turning part.

In the above-mentioned example of this invention, the idling sprocket wheels 19 and 20 are provided only above the movable sprocket wheels 27 and 28. However, this invention is not limited to the above-mentioned example. For example, as shown in FIG. 4, other idling wheels 40 and 41 can be provided.

Figure 5:
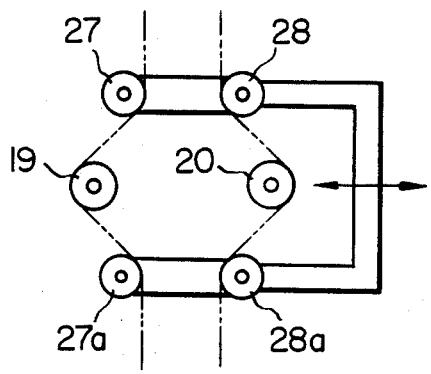
Figure 6:
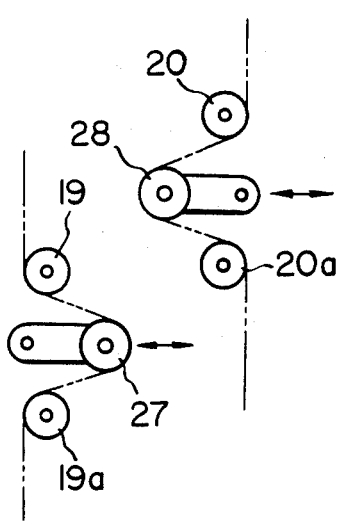

Furthermore, as shown in FIG. 5, two pair of movable sprocket wheels 27, 28, 27a, and 28a can be provided.

Figure 7:
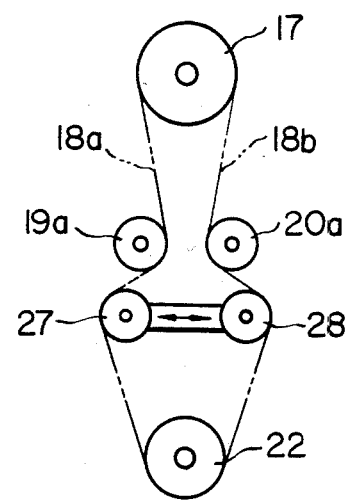

Furthermore, as shown in FIG. 7, the driven sprocket wheels 27 and 28 can be engaged with an inner side of the chain 18.

Furthermore, though in the above-mentioned example of this invention, sprocket wheels and chains are used, this invention is not limited to the above-mentioned example. Instead of chain drive system, belt drive system or rope drive system can be applied.

As described above, according to this invention, it is possible to provide a phase control device which is simple in construction and is excellent in durability against water and whose installation to machine is easy.

We claim:

1. A phase control system comprising;
   a first conveyor for conveying articles;
   as second conveyor receiving articles from said first conveyor;
   drive means for simultaneously driving said first and second conveyor means;
   a driven sprocket wheel for driving said first conveyor;
   a driving sprocket wheel linked to said drive means;
   an endless loop chain having an advancing portion and return portion connecting said driven wheel and said driving wheel;
   at least one pair of movable wheels engaging said advancing portion and said returning portion traverse to the direction of movement of said endless loop chain between said driven wheel and said driving wheel;
   adjusting means for adjusting said pair of movable wheels traverse to direction of movement of said endless loop chain to tighten the advancing portion while loosening the returning portion or vice versa;
   said adjusting means comprising a movably mounted support supporting said movable wheel; an arm attached to said support for moving said support toward either the advancing portion or returning portion of said endless loop chain; a stepping motor linked to said arm to incrementally move said support toward either the advancing portion or returning portion of said endless loop chain in response to a speed signal representing a change in speed of said conveyors thereby automatically maintaining the respective phase relationship of said first and second conveyors.

2. The system according to claim 1 in which said support means comprises a tiltable yoke supporting said movable wheels; said arm tilting said yoke toward said advancing portion or said returning portion of said endless loop chain thereby controlling said phase relationship.

3. The system according to claim 1 in which there are two pair of movable wheels; said support means comprising a yoke traverse to the direction of movement of said endless loop chain; each arm of said yoke having a pair of movable wheels, with one wheel of each engaging respectively the advancing portion or the returning portion of said endless loop chain.

* * * * *